(12) United States Patent
Ogami et al.

(10) Patent No.: US 8,788,959 B1
(45) Date of Patent: Jul. 22, 2014

(54) SYSTEM AND METHOD FOR MONITORING A TARGET DEVICE

(75) Inventors: Kenneth Ogami, Bothell, WA (US); Doug Anderson, Edmonds, WA (US); Andrew Best, Brier, WA (US); Marat Zhaksilikov, Snohomish, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 1023 days.

(21) Appl. No.: 12/058,586

(22) Filed: Mar. 28, 2008

Related U.S. Application Data

(63) Continuation-in-part of application No. 12/004,833, filed on Dec. 21, 2007, now Pat. No. 8,266,575.

(60) Provisional application No. 60/926,096, filed on Apr. 25, 2007.

(51) Int. Cl.
*G06F 3/048* (2013.01)

(52) U.S. Cl.
USPC ............................................ 715/771; 715/756

(58) Field of Classification Search
CPC ................................ G06F 3/048; G06F 3/0484
USPC .................................................. 715/771, 756
See application file for complete search history.

(56) References Cited

U.S. PATENT DOCUMENTS

| | | | |
|---|---|---|---|
| 6,078,741 A | 6/2000 | Ma et al. | |
| 6,460,172 B1 | 10/2002 | Insenser Farre et al. | |
| 6,546,297 B1 | 4/2003 | Gaston et al. | |
| 6,671,869 B2 | 12/2003 | Davidson et al. | |
| 6,714,016 B2 | 3/2004 | Odaohhara et al. | |
| 6,784,903 B2 | 8/2004 | Kodosky et al. | |
| 6,941,356 B2 | 9/2005 | Meyerson | |
| 6,961,686 B2 | 11/2005 | Kodosky et al. | |
| 7,003,732 B1* | 2/2006 | Zhaksilikov | 715/771 |
| 7,086,014 B1 | 8/2006 | Bartz et al. | |
| 7,100,133 B1 | 8/2006 | Meiyappan et al. | |
| 7,113,090 B1* | 9/2006 | Saylor et al. | 340/539.18 |
| 7,143,360 B1 | 11/2006 | Ogami et al. | |
| 7,152,027 B2 | 12/2006 | Andrade et al. | |
| 7,337,407 B1 | 2/2008 | Ogami et al. | |
| 7,437,692 B2 | 10/2008 | Oberlaender | |
| 7,650,264 B2 | 1/2010 | Kodosky et al. | |
| 7,809,545 B2 | 10/2010 | Ciolfi et al. | |
| 2003/0110464 A1 | 6/2003 | Davidson et al. | |
| 2004/0221249 A1 | 11/2004 | Lahner et al. | |
| 2005/0237304 A1* | 10/2005 | Anandakumar et al. | 345/166 |
| 2008/0086668 A1 | 4/2008 | Jefferson et al. | |
| 2008/0178143 A1* | 7/2008 | Dougan et al. | 717/100 |
| 2010/0023865 A1* | 1/2010 | Fulker et al. | 715/734 |

OTHER PUBLICATIONS

"PSoC Designer: Integrated Development Environment User Guide"; Jul. 17, 2001; Cypress MicroSystems; Revision 1.11; all pages.

U.S. Appl. No. 12/004,833: "Systems and Methods for Dynamically Reconfiguring a Programmable System on a Chip," Memula, Suresh et al., Filed on Dec. 21, 2007; 50 pages.

(Continued)

*Primary Examiner* — Andrea Leggett

(57) ABSTRACT

Target device monitoring systems and methods are presented. In one embodiment, a target device monitoring update method includes receiving a change in design element value in real time, wherein the design element values are associated with an operating target device. The changes in the design element value are analyzed. Express interface information is updated in accordance with results of the analyzing.

18 Claims, 15 Drawing Sheets

(56) References Cited

OTHER PUBLICATIONS

U.S. Appl. No. 12/058,534: "System and Method for Controlling a Target Device," Kenneth Ogami et al., filed on Mar. 28, 2008; 55 pages.
Ryan Seguine et al, "Layout Guidelines for PSoC CapSense", Cypress Application Note AN2292, Revision B, Oct. 31, 2005; all pages.
USPTO Advisory Action for U.S. Appl. No. 12/004,833 dated Aug. 9, 2011; 3 pages.
USPTO Advisory Action for U.S. Appl. No. 12/058,534 dated Jul. 16, 2012; 3 pages.
USPTO Advisory Action for U.S. Appl. No. 12/058,534 dated Aug. 11, 2011; 3 pages.
USPTO Final Rejection for U.S. Appl. No. 12/058,534 dated Apr. 25, 2012; 12 pages.
USPTO Final Rejection for U.S. Appl. No. 12/004,833 dated May 25, 2011; 11 pages.
USPTO Final Rejection for U.S. Appl. No. 12/058,534 dated Jun. 2, 2011; 15 pages.
USPTO Non Final Rejection for U.S. Appl. No. 13/586,648 dated Jul. 18, 2013; 6 pages.
USPTO Non-Final Rejection for U.S. Appl. No. 12/004,833 dated Nov. 9, 2011; 11 pages.
USPTO Non-Final Rejection for U.S. Appl. No. 12/004,833) dated Dec. 21, 2010; 8 pages.
USPTO Non-Final Rejection for U.S. Appl. No. 12/058,534 dated Jan. 11, 2011; 17 pages.
USPTO Non-Final Rejection for U.S. Appl. No. 12/058,534 dated Oct. 4, 2013; 22 pages.
USPTO Non-Final Rejection for U.S. Appl. No. 12/058,534 dated Dec. 16, 2011; 11 pages.
USPTO Notice of Allowance for U.S. Appl. No. 12/004,833 dated Mar. 1, 2012; 7 pages.
USPTO Notice of Allowance for U.S. Appl. No. 12/004,833 dated May 24, 2012; 5 pages.
USPTO Notice of Allowance for U.S. Appl. No. 12/004,833 dated Jun. 21, 2012; 5 pages.
USPTO Notice of Allowance for U.S. Appl. No. 12/004,833 dated Jul. 19, 2012; 5 pages.
USPTO Notice of Allowance for U.S. Appl. No. 13/586,648 dated Sep. 16, 2013; 6 pages.
USPTO Requirement for Restrictions for U.S. Appl. No. 12/004,833 dated Sep. 22, 2010; 6 pages.
USPTO Final Rejection for U.S. Appl. No. 12/058,534 dated Jan. 15, 2014; 17 pages.
USPTO Advisory Action for U.S. Appl. No. 12/058,534 dated Mar. 14, 2014; 4 pages.

* cited by examiner

455

```
┌─────────────────────────────────┐
│ DIRECTING MONITORING OF VALUES FROM AN │
│ OPERATING TARGET DEVICE IN REAL TIME. │
│              451                │
└─────────────────────────────────┘
                 │
┌─────────────────────────────────┐
│      EVALUATING THE VALUES.     │
│              452                │
└─────────────────────────────────┘
                 │
┌─────────────────────────────────┐
│ ALTERING EXPRESS INTERFACE INFORMATION │
│ BASED ON THE OUTCOME OF THE EVALUATING. │
│              453                │
└─────────────────────────────────┘
                 │
┌─────────────────────────────────┐
│ DIRECTING PRESENTATION OF THE EXPRESS │
│ INTERFACE INFORMATION AND THE FINDINGS. │
│              454                │
└─────────────────────────────────┘
```

```
┌─────────────────────────────────────────┐
│ A USER FRIENDLY INTUITIVE GRAPHICS USER │
│ INTERFACE FOR INITIATING THE DIRECTION IS│
│               PRESENTED.                │
│                  510                    │
└─────────────────────────────────────────┘
                    │
┌─────────────────────────────────────────┐
│ A HIGH LEVEL DIRECTION TO CHANGE A DESIGN│
│ ELEMENT VALUE IS RECEIVED AT THE EXPRESS │
│               INTERFACE.                │
│                  520                    │
└─────────────────────────────────────────┘
                    │
┌─────────────────────────────────────────┐
│ DESIGN ELEMENT VALUES CORRESPONDING TO THE│
│         DIRECTION ARE CREATED.          │
│                  530                    │
└─────────────────────────────────────────┘
                    │
┌─────────────────────────────────────────┐
│ THE DESIGN ELEMENT VALUES ARE FORWARDED TO│
│ THE OPERATING TARGET DEVICE IN REAL TIME.│
│                  540                    │
└─────────────────────────────────────────┘
```

```
┌─────────────────────────────────────┐
│ DESIGN ELEMENT VALUE ALTERATION     │
│ INDICATIONS ARE INTERPRETED.        │
│ 551                                 │
└─────────────────────────────────────┘
                  │
┌─────────────────────────────────────┐
│ INFORMATION CORRESPONDING TO THE    │
│ DESIGN ELEMENT VALUE ALTERATION     │
│ INDICATIONS IS FORMULATED.          │
│ 552                                 │
└─────────────────────────────────────┘
                  │
┌─────────────────────────────────────┐
│ TARGET CONFIGURATION BASED ON THE   │
│ OUTCOME OF THE EVALUATING IS        │
│ FORWARDED TO AN OPERATING TARGET    │
│ DEVICE IN REAL TIME.                │
│ 553                                 │
└─────────────────────────────────────┘
                  │
┌─────────────────────────────────────┐
│ PRESENTATION OF THE EXPRESS         │
│ INTERFACE INFORMATION IS DIRECTED   │
│ AND INCLUDING INFORMATION           │
│ ASSOCIATED WITH THE ALTERATION      │
│ INDICATIONS.                        │
│ 554                                 │
└─────────────────────────────────────┘
```

FIGURE 5B

SYSTEM AND METHOD FOR MONITORING A TARGET DEVICE

RELATED APPLICATIONS

This Application claims the benefit and priority of Provisional Application No. 60/926,096 entitled "Novel Features for a Design Tool" filed on Apr. 25, 2007, which is incorporated herein by this reference. This Application is also a continuation in part of U.S. patent application Ser. No. 12/004,833 entitled "Systems and Methods for Dynamically Reconfiguring a Programmable System on a Chip" filed Dec. 21, 2007, which is incorporated herein by this reference.

This application is also related to U.S. Pat. No. 6,971,004, application Ser. No. 09/989,817, filed Nov. 19, 2001 entitled "System and Method of Dynamically Reconfiguring a Programmable System on a Chip" and patent application Ser. No. 10/256,829, filed Sep. 27, 2002 entitled "Graphical User Interface for Dynamically Reconfiguring a Programmable Device" which are hereby incorporated by this reference.

FIELD OF THE INVENTION

Embodiments of the present invention generally relate to the field of integrated circuit chips. More specifically, embodiments of the present invention pertain to a system and method for dynamically reconfiguring a programmable system on a chip.

BACKGROUND

Electronic systems and circuits have made a significant contribution towards the advancement of modern society and are utilized in a number of applications to achieve advantageous results. Numerous electronic technologies such as digital computers, calculators, audio devices, video equipment, and telephone systems have facilitated increased productivity and reduced costs in analyzing and communicating data, ideas and trends in most areas of business, science, education and entertainment. Electronic systems designed to provide these benefits often include integrated circuits on a single substrate that provide a variety advantages over discrete component circuits. However, traditional design and manufacturing approaches for integrated circuits are often very complex and consume significant resources.

Traditionally electronic components were custom designed for a relatively narrow range of applications with a fixed combination of required peripheral functionalities. Developing custom component designs with particular fixed peripherals is time and resource intensive. Even if a component may suffice for more than one application, determining which one of the different available particular microcontroller designs is best suited for a particular application is challenging. In addition, the unique aspects of the intended application often make it difficult to find an optimum component, usually necessitating a compromise between the convenience of using an existing component design and less than optimum performance. For a number of conventional approaches, when a suitable component is found, subsequent changes to the application and new requirements placed on the application can lead to the need for a totally different traditional component.

Traditional components that attempt to provide some flexibility can be problematic because they tend to require a sophisticated amount of design expertise and the obstacles of long development times and high costs still remain. To the extent some flexibility may be provided by the inclusion of gate arrays or other logic devices, the traditional approaches remain expensive and require a sophisticated level of design expertise. In addition traditional integrated circuit configurations and functionality are typically set during initial manufacture and are not readily adaptable to changing conditions in the field.

In addition to complexity and sophisticated design procedures, real time monitoring and/or control of operating components can be challenging. Traditional monitoring and/or control of integrated circuits typically involves complex interactions with complicated command structures and syntaxes that are not readily comprehendible or user friendly. Recognizing alterations in convoluted expressions of operating states, evaluating implications of the alterations and/or reacting to the evaluation appropriately using elaborate command and data input mechanisms with sufficient speed to be useful in real time is particularly difficult.

SUMMARY

Target device monitoring systems and methods are presented. In one embodiment, a target device monitoring update method includes receiving a change in design element value in real time, wherein the design element values are associated with an operating target device. The changes in the design element value are analyzed. Express interface information is updated in accordance with results of the analyzing.

DRAWINGS

The accompanying drawings, which are incorporated in and form a part of this specification, illustrate embodiments of the invention by way of example and not by way of limitation. The drawings referred to in this specification should be understood as not being drawn to scale except if specifically noted.

FIG. 4B is a flow chart of another exemplary target device monitoring update method in accordance with one embodiment of the present invention.

FIG. 5A is a flow chart of an exemplary host emulation target device control method in accordance with one embodiment of the present invention.

FIG. 5B is a flow chart of another exemplary target device monitoring update method in accordance with one embodiment of the present invention.

DETAILED DESCRIPTION OF THE INVENTION

Figure 1A:
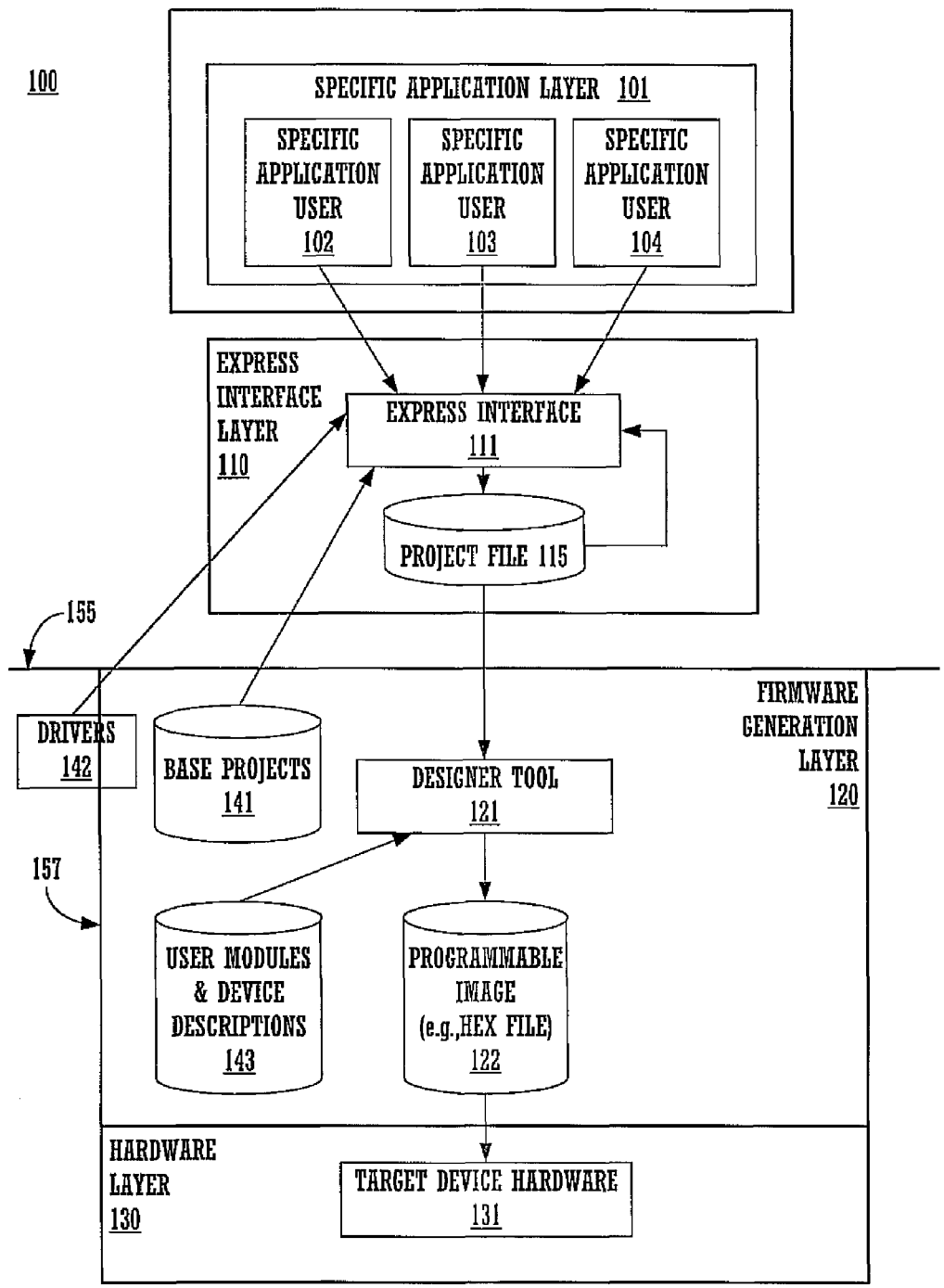
FIG. 1A is a block diagram of an exemplary express design system architecture in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

Systems and methods for monitoring and controlling an operating reconfigurable target device in real time are presented. In one embodiment of the present invention, a user friendly graphical user interface is utilized to facilitate symbolic indication of corresponding changes in a design element value. In one exemplary implementation of the present invention, a plurality of configuration images defining different configurations and functionalities of a target device are stored in a memory included in the target device. The image information including various element values can be monitored and/or controlled in real time during target device operation. The configuration image data can be generated, monitored, updated and loaded on the target device in various manners including by an express interface and electronic device design tool. In one embodiment, the express interface and electronic device design tool comprise progressively higher level representations of the target device design element values and are utilized to generate project files for directing automated utilization by a lower level device designer that defines module personalization and parameterization, generates source code (e.g., application program interface code), and facilitates debugging. The exemplary embodiments described herein (e.g., a microcontroller) are not meant to limit the application of the present invention to any specific integrated circuit device or type (e.g., a microcontroller) and embodiments of the present invention may be implemented in a variety of integrated circuits.

FIG. 1A is a block diagram of an exemplary express design system architecture 100 in accordance with one embodiment of the present invention. Express design system architecture 100 includes specific application layer 101, express interface layer 110, firmware generation layer 120, and hardware layer 130. Specific application layer 101 includes specific application user 102, specific application user 103 and specific application user 104. Express interface layer 110 includes express interface 111, and project file 115. Firmware generation layer includes designer tool 121, programmable image 122, drivers 142, base projects 141 and user modules and device descriptions 143. Hardware layer 131 includes target device hardware 131.

The components of express design system architecture 100 cooperatively operate to facilitate convenient configuration of target device hardware 131. The architecture can cover three domains, a simplified user domain above line 155 and below line 155 an expert user domain to the right of line 157 and driver author domain to the left of line 157. In the simplified user domain a specific application user 102, 103 or 104 can input directions to express interface 111. The specific application users can be a variety of different types of users (e.g., an ICO maker, battery charger manufacturer, a power meter manufacturer, etc.) with minimal amount of knowledge and/or experience in the low level design intricacies associated with the target device hardware 131. Express interface 111 provides a user friendly convenient graphically user interface (GUI) which conveys information between a user and the target device hardware 131 while performing translation between relatively simple symbolic representations of information presented to the user and corresponding complex information utilized by the target hardware device 131.

In one embodiment, the express design interface is a high-level embedded system design tool that automatically generates a complete application ready to program into an embedded system or target device. A user can create a complete design for a target device and monitor and/or control the design element values in real time while the target device is operating. In one exemplary implementation the user can perform the designing, monitoring and/or controlling without manually entering traditional programming code (e.g., assembly language code, "C" programming code, etc.) or reading a data sheet.

In one embodiment, the express design interface allows users to create a circuit design by dragging and dropping high level "widget" icons representing design elements within a graphical user interface (GUI) window. The widgets are icons that can be utilized to represent the functions and values associated with a design element. The design elements can represent a variety of "widgets" including input devices, environment measuring devices, transfer functions, output devices, etc. For example, the design elements can be buttons, sliders, LED devices, temperature sensors, alarms, fans, transfer functions, logic for generating an alarm, etc. The widget icons and associated information boxes can be presented in a variety of manners (e.g., textual, graphical, etc.) and present various information (e.g., slider position, on/off status, level, brightness, etc). User inputs associated with the high level design elements are automatically translated and utilized to create lower level user module information which is fed into a design tool for automated generation of information implemented in a target device.

In one embodiment, the express user interface is implemented on a host computer that is coupled to a target device (e.g., a microcontroller) via a communication interface. The onscreen widgets are mapped to registers of the target device. For example, the on screen widgets are mapped to registers that hold values representing the current state of the design elements during the execution of an application running on the microcontroller of the target device. Some of the communication registers (e.g., RAM, other memory registers, etc.) are read only areas and some are read/write areas.

In one embodiment, the updating of the widgets of a design is performed in real time during run-time as an application is being executed on the microcontroller so that the designer can directly observe the real time states of the communication registers. In one exemplary implementation, software periodically monitors the values of the communication registers within the microcontroller and these values are mapped back to the associated widgets. The graphical representation of the widget is then updated live based on the live update data from the target hardware. Therefore, inputs, outputs, values of transfer functions, etc., can be directly observed during the operation of an application on the microcontroller. This is very helpful for debugging purposes, etc. For example, button presses, temperatures, output values, transfer function values, and logic can be observed in real-time on the host computer screen via the widgets.

A microcontroller of the target device can be emulated on the host computer during the monitoring of an application executing on the target hardware. Instructions can be input to the target hardware from the host computer. The instructions can be directed to a variety of activities including changing program flow, mode of operation, etc. that would have originated from a host computer system connected the target hardware. In one embodiment, the interface is emulated using the features of a board monitor.

In one embodiment a drop down menu within the express interface window allows a user to change the mode of operation of the application running on the target hardware. The drop down window or menu can allow the user to input a command that alters read/write area of the communication registers (RAM) on the target device. The command can then cause some reaction within the target hardware which is observed by the real-time update monitoring of the widgets on the host computer screen. In one embodiment, a host emulation does not permit the read only RAM registers to be updated and ROM portion of the microcontroller either.

The information input to the GUI is translated by the express interface 111. In one embodiment, express interface retrieves driver information 142 and base project information 141 corresponding to received input information and generates project files 115. Project file 115 includes instructions and data for directing automated utilization by a lower level device designer that defines module personalization and parameterization, generates source code (e.g., application program interface code), and facilitates debugging.

Figure 1B:
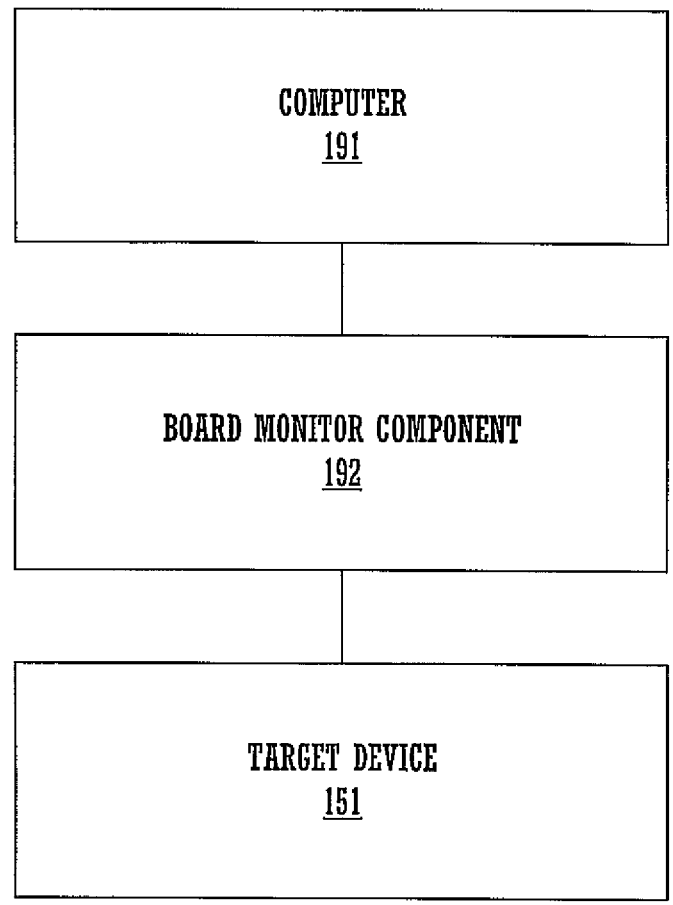
FIG. 1B is a bock diagram of an exemplary express design system in accordance with one embodiment of the present invention.

FIG. 1B is a bock diagram of an exemplary express design system 190 in accordance with one embodiment of the present invention. Express design system 190 includes host computer system 191, board monitor component 192 and target device 151. Host computer system 191 is communicatively coupled to board monitor component 192 which in turn is coupled to target device 151.

The components of exemplary design system 190 cooperatively operate to design and monitor target device 151. Target device 151 can implement a variety of configurations and functionalities. Host computer system 191 creates a design definition for implementing the variety of configuration and functionalities and monitoring operations of the target device in real time. The board monitor component 192 interfaces between the host computer system and the target device in real time while the target device is operating. In one embodiment, the board monitor component includes a USB interface for interfacing with the host computer and an I2C interface for interfacing with the target device. In one exemplary implementation, the board monitor is working on a hex file as the hex file is executing on the target device. The hex file can be static. The host computer comprises a graphical user interface presentation in a user friendly intuitive configuration that automatically updates the presentation in accordance with design element values received in real time.

The host computer system can also emulate a microcontroller of the target device in real time while the target device is operating. When a host computer is emulating a microcontroller of the target device a user can change the values in real time. The monitoring function also permits the user to receive information and analyze the impacts of the changes in real time. The inputting includes symbolically indicated inputs.

Figure 6:
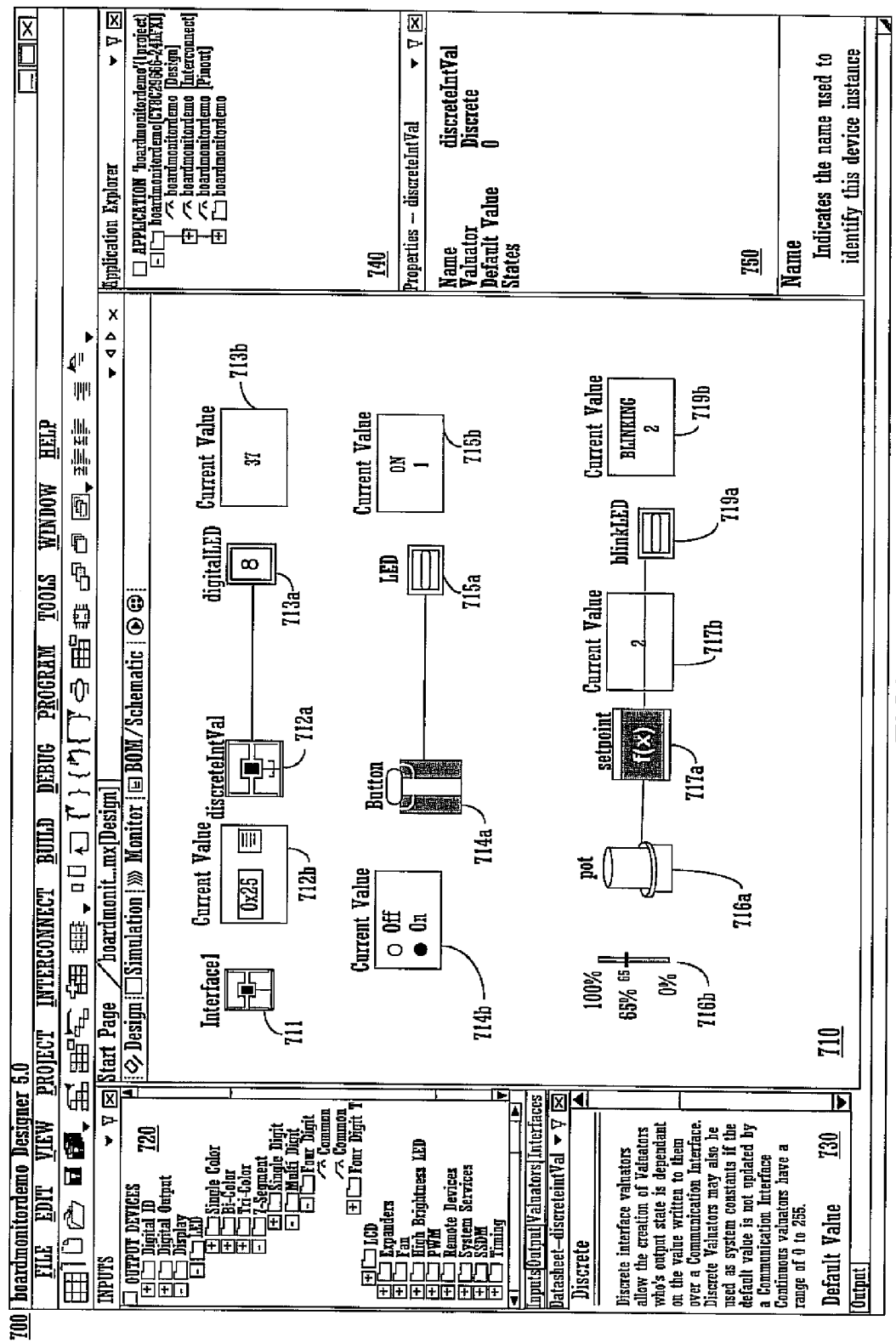
FIG. 6 is a block diagram of an exemplary graphical user interface (GUI) in accordance with one embodiment of the present invention.

FIG. 6 is a block diagram of an exemplary graphical user interface (GUI) 700 in accordance with one embodiment of the present invention. In one embodiment, GUI 700 helps a user select parameter values for design elements. While the present invention facilitates automation of design activities, it can also flexibly prompt a set of questions in a convenient and efficient interface until desirable user information on design elements is retrieved. The GUI 700 can include one or more editable input mechanisms for specifying parameters of the given design element. In one exemplary implementation, the express design system also determines if a specified value of a given parameter impacts another parameter of a design element. If one or more design element parameters change as a result of a change to a given parameter, the GUI displays the new value of the given parameter that changed along with changes to the other parameters. Graphical user interface GUI 700 includes a main portion 710, design element catalog portion 720, data sheet portion 730, application portion 740 and properties portion 750. Main portion 710 displays a design in variety of convenient presentations.

The main portion 710 can display widget icons and corresponding information boxes incorporated in a design. For example, the main portion can display widget icons including interface icon 711, valuator icon 712a, digital 8 segment LED icon 713a, pushbutton icon 714a, LED 715a, potentiometer icon 716a, setpoint icon 717a, and blink icon 719a. The main portion also displays corresponding information boxes including valuator information box 712b, digital 8 segment LED information box 713b, pushbutton information box 714b, LED information box 715b, potentiometer information box 716b, setpoint information box 717b, and blink information box 719b.

It is appreciated, items in the GUI may be displayed with different visual attributes. For example, color, highlighting or the like may be used to organize, associate or differentiate one or more items from one or more other items in the GUI. The information boxes can include a variety of information associated with a design element including status, present or current value indications, and transfer function indications. Associations or relationships between design elements can be indicated with lines between the design icons.

The design element catalog portion 720 includes a listing of various design elements. A user can create a circuit design by dragging and dropping high level "widget" icons representing design elements within a design window. In one implementation, the user may select a design element from a design element catalog portion of the design window. In selecting a design element, the user drags a widget icon from the design element catalog 720 to a design element selection and interconnection of the main portion 710 of the design window. The user may also include an association or "connection" between the design elements by linking corresponding widget icons, in the design element selection and interconnection of main portion 710.

The design element data sheet portion 730 displays technical data concerning corresponding design elements. Properties portion 750 displays parameters and parameter values for corresponding design elements, and or the like. Application portion 740 includes information on an application or project the design is associated with.

Figure 7:
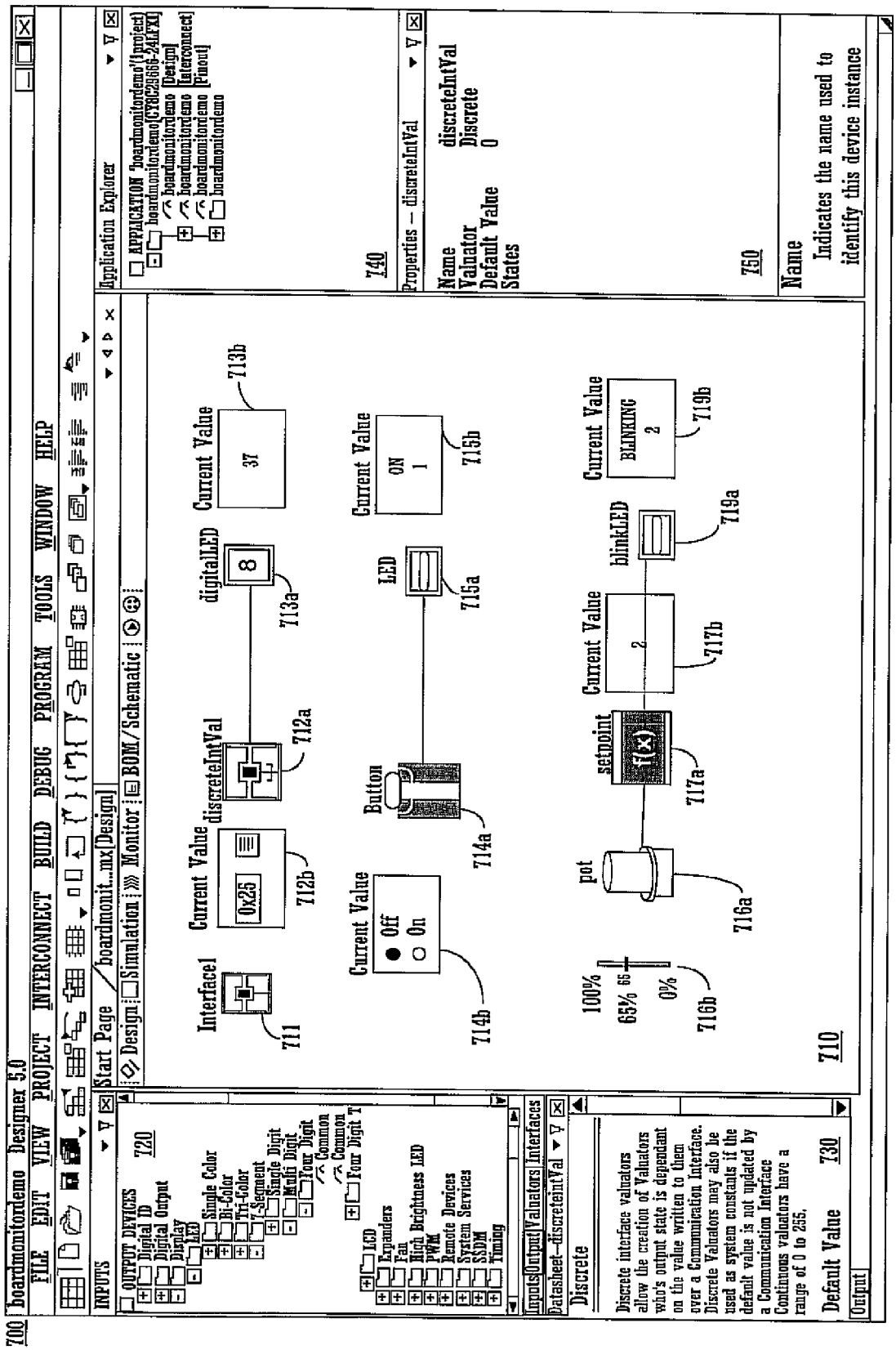
FIG. 7 is block diagram of exemplary graphical user interface (GUI) with updated information in accordance with one embodiment of the present invention.

It is appreciated that exemplary graphical user interface (GUI) 700 can be utilized in a monitor mode. In one embodiment exemplary graphical user interface (GUI) 700 is utilized to monitor a target device during run-time. In one exemplary implementation, the information displayed on the exemplary graphical user interface (GUI) 700 can be updated in real time to reflect run time operations of the target device. It is appreciated that graphical user interface (GUI) 700 can be utilized to monitor an actual target device or emulation of a target device. FIG. 7 is block diagram of exemplary graphical user interface (GUI) 700 with updated information in accordance with one embodiment of the present invention. In FIG. 7 the current value presented in the valuator information box 712b, pushbutton information box 714b, LED and potentiometer information box 716b has changed from the information presented in FIG. 6.

Figure 8A:
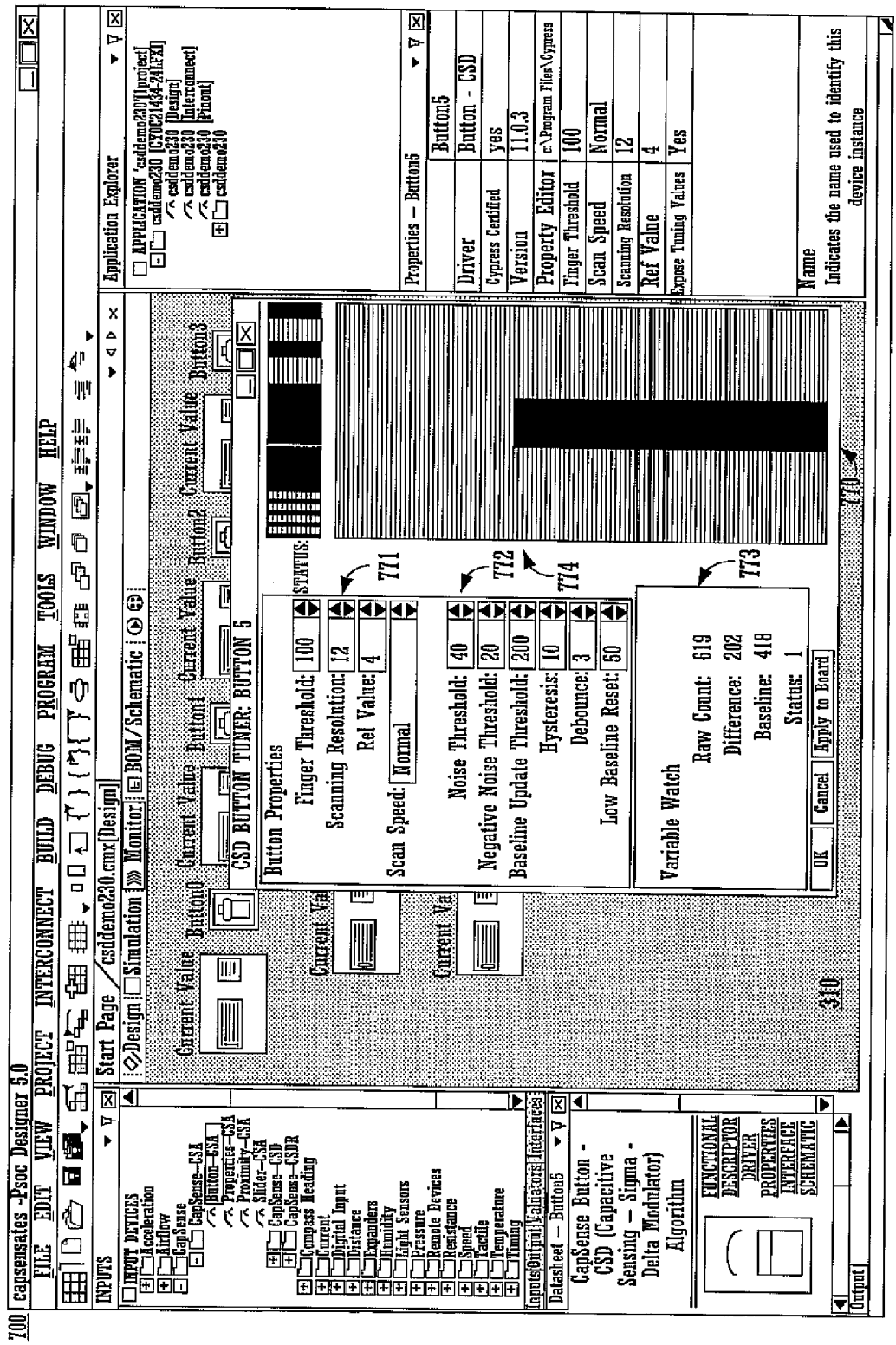
FIG. 8A is a block diagram of an exemplary graphical user interface with different design information including a configuration box presenting configuration information in accordance with one embodiment of the present invention.
Figure 8B:
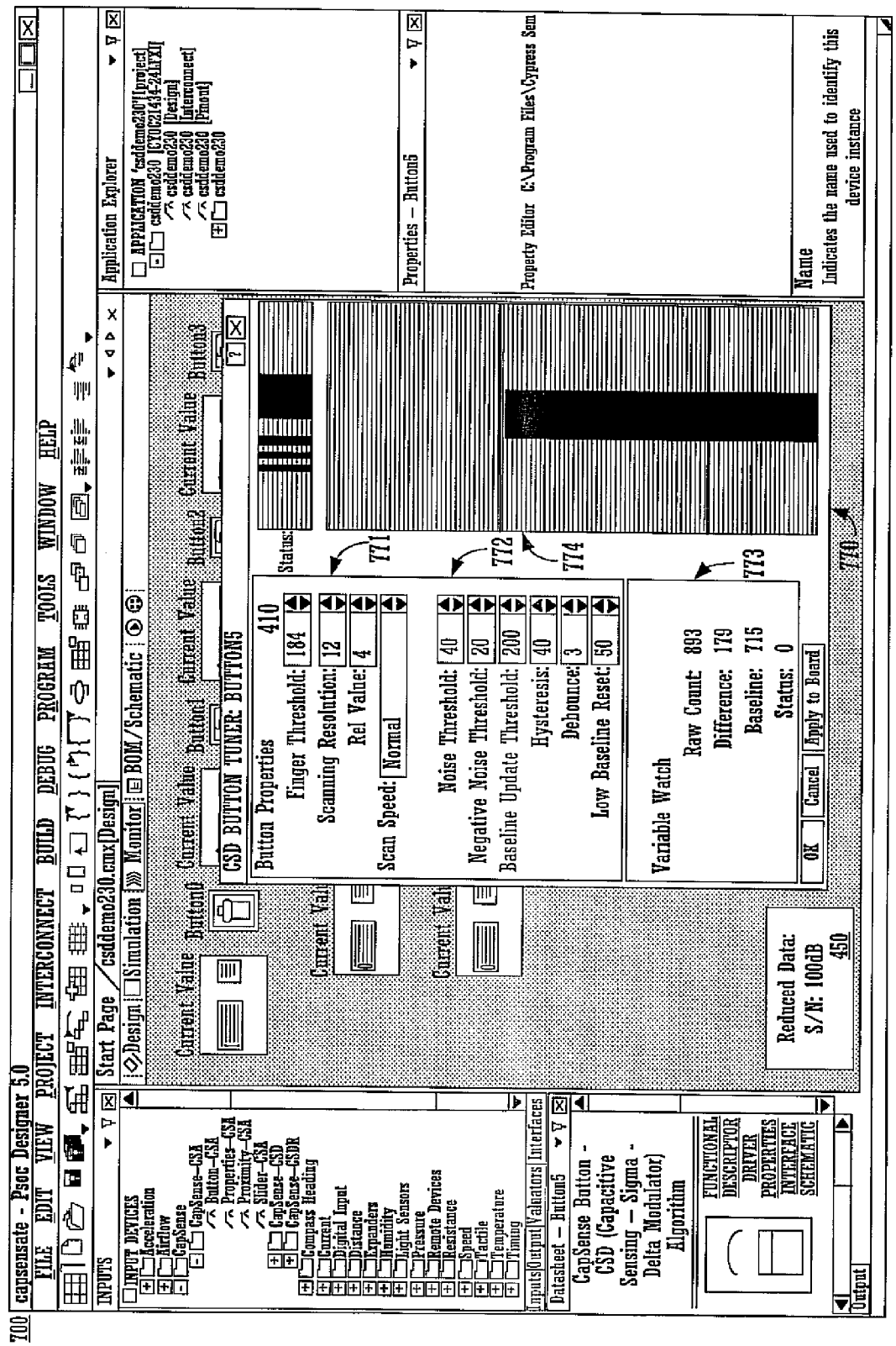
FIG. 8B is a block diagram of an exemplary graphical user interface presenting changes in a configuration box in accordance with one embodiment of the present invention.

Additional configuration information can be also be presented. FIG. 8A is a block diagram of graphical user interface (GUI) 700 with different design information including a configuration box 770 presenting configuration information. In one exemplary implementation, configuration box 770 includes a device element specific portion 771, global information portion 772, variable information portion 773 and a graphical representation portion 774. A user can indicate changes to the configuration information at both original design and in a tuner mode during run time. In one exemplary implementation a user can direct a change in a widget specific value that is also reflected in the graphical representation portion. For example, a user can change the button property finger threshold value of 100 shown in portion 771 of FIG. 8A to a value of 184 shown in FIG. 8B and the corresponding indications of the change can be reflected in the graphical portion 774.

Figure 9A:
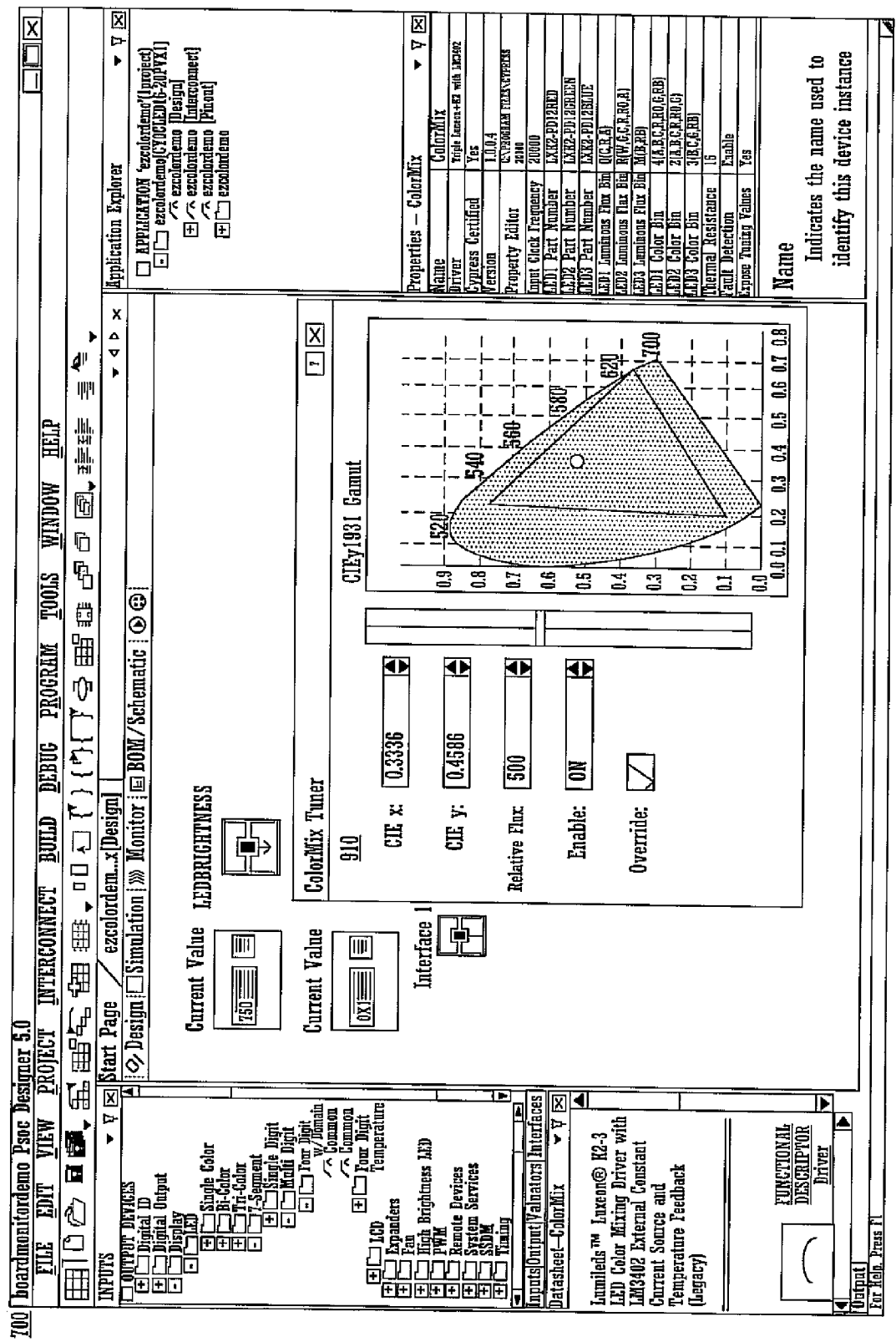
FIG. 9A is a block diagram of an exemplary graphical user interface showing configuration information associated LED design element in accordance with one embodiment of the present invention.
Figure 9B:
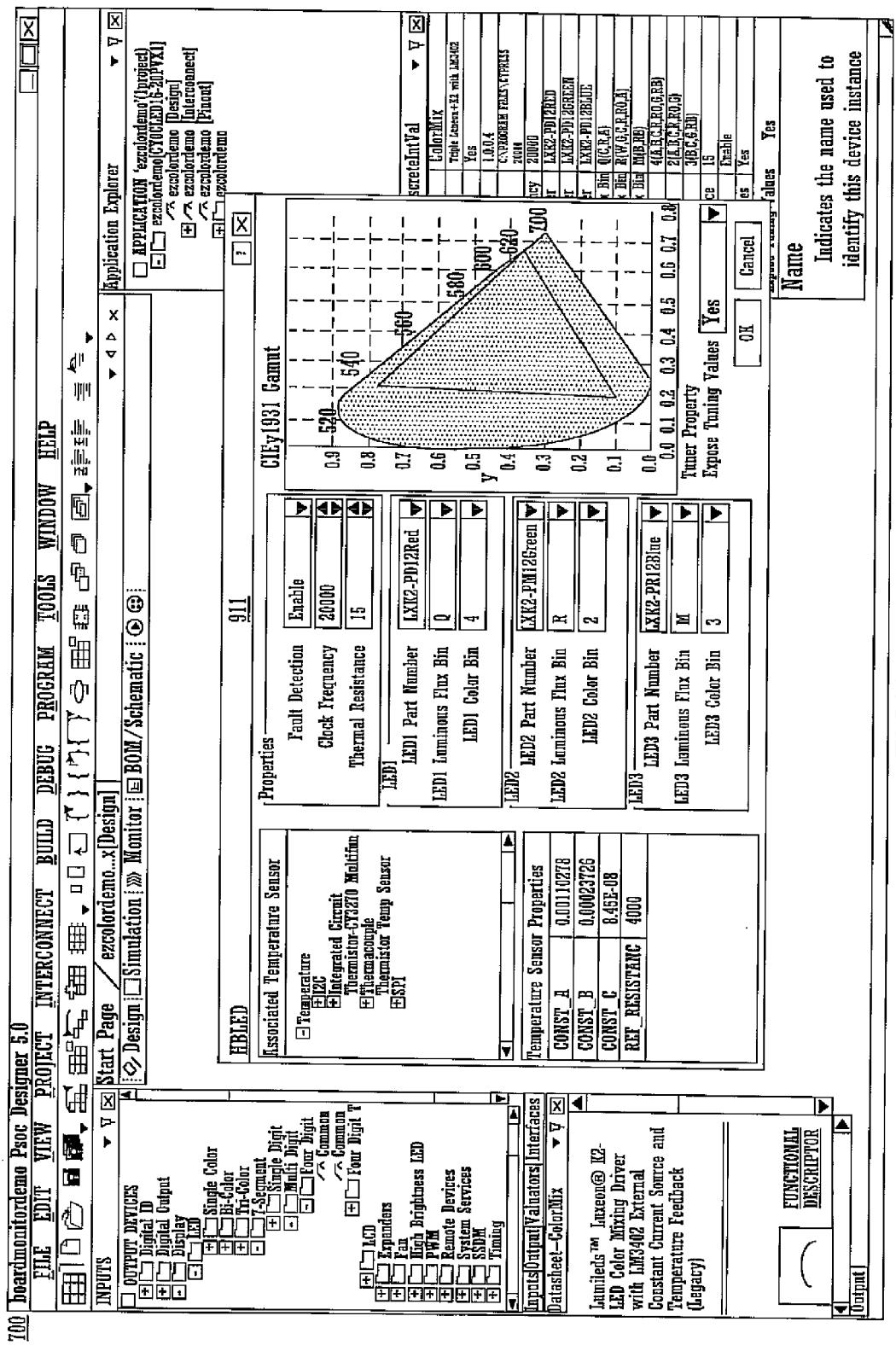
FIG. 9B is a block diagram of an exemplary graphical user interface showing different configuration information associated LED design element in accordance with one embodiment of the present invention.
Figure 10:
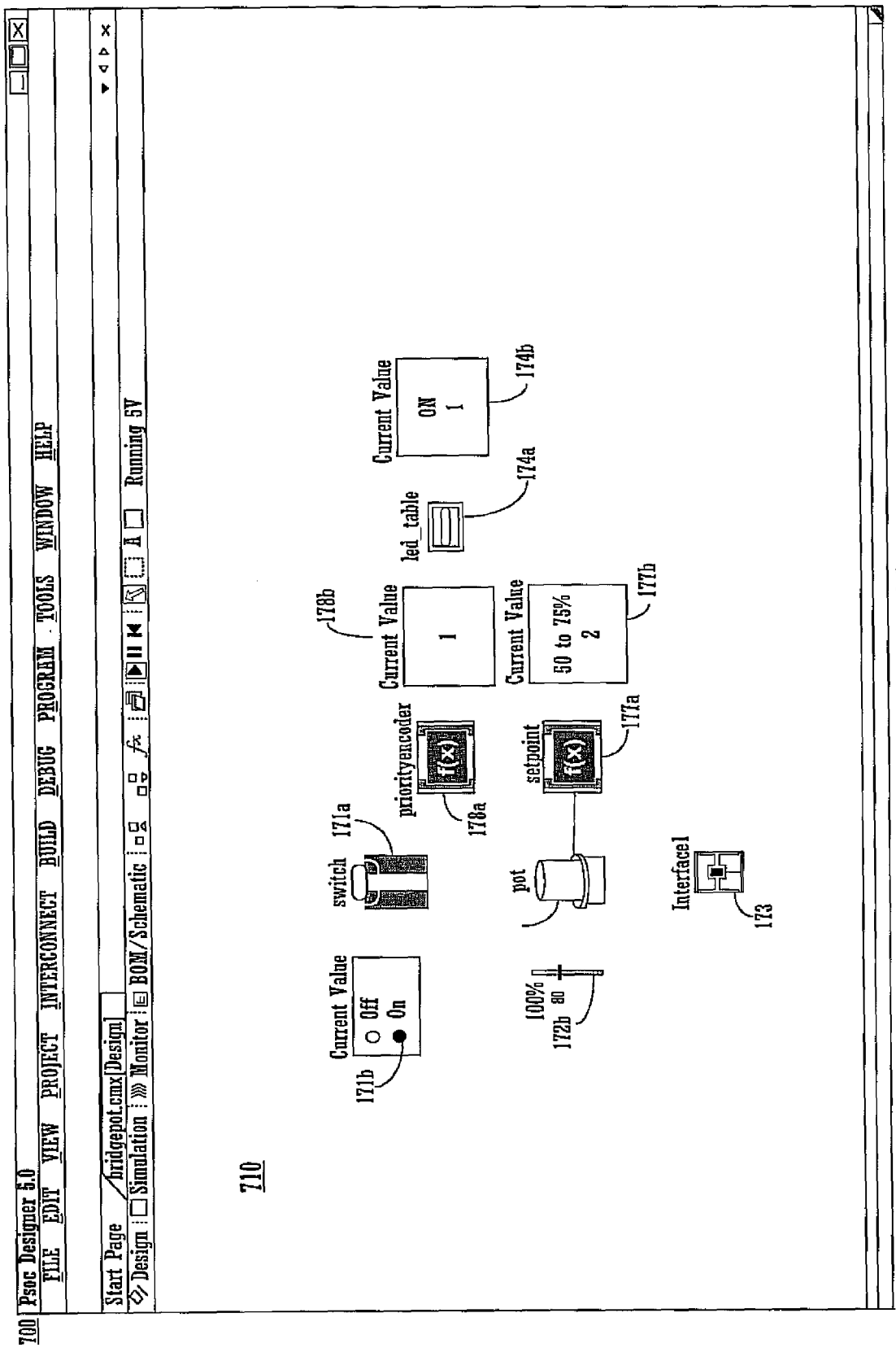
FIG. 10 is a block diagram of an exemplary graphical user interface showing different design information in accordance with one embodiment of the present invention.

It is appreciated that a variety of configuration presentations are readily adapted to the present invention. FIG. 9A is block diagram of exemplary graphical user interface (GUI) 700 showing different information in a configuration box 910. For example, FIG. 9A shows an exemplary presentation of configuration information for an LED widget. It is also appreciated a variety of different levels of detail or granularity can be presented. FIG. 9B shows another exemplary presentation of information for an LED widget with additional configuration information 911 conveniently presented It is appreciated that a variety of different designs can be presented in main portion 710. For example, FIG. 10 is a block diagram of a graphical user interface (GUI) 700 with different information in main portion 710. For example, main portion 710 includes switch icon 171a, potentiometer icon 172a, interface icon 173a and led icon 174a with corresponding respective switch information box 171b, potentiometer information box 172b, interface information box 173b and led information box 174b. It is appreciated the information can be presented as graphic representation of the information (e.g., potentiometer information box 172a include a potentiometer scale graphic). The GUI 170 also includes function transfer indicators including priority encoder icon 178a and setpoint icon 177a and respective corresponding encoder information box 178b and setpoint information box 177b.

Figure 2:
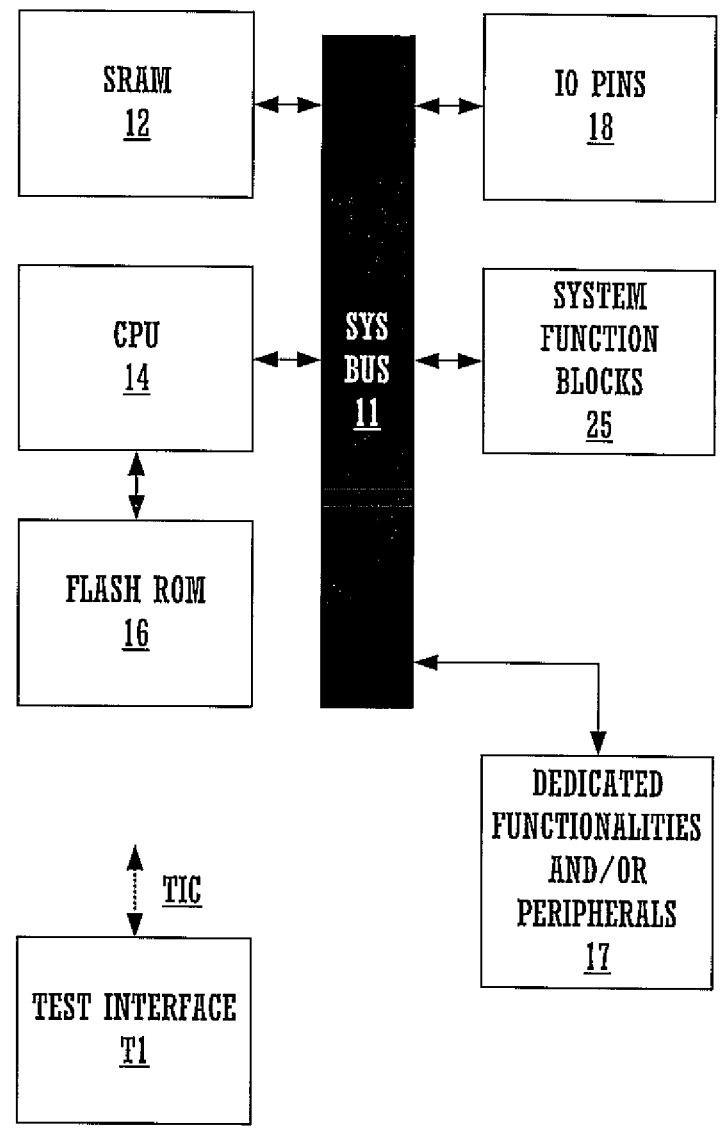
FIG. 2 is a block diagram showing a high level view of an exemplary target device integrated circuit upon which embodiments of the present invention may be implemented.

FIG. 2 is a block diagram showing a high level view of an exemplary target device integrated circuit 10 upon which embodiments of the present invention may be implemented. In one embodiment, target device integrated circuit 10 includes a communication bus 11, static random access memory (SRAM) 12, central processing unit (CPU) 14, flash read-only memory (ROM) 15, input/output (I/O) pin(s) 18 and configurable functional component 25. Communication bus 11 is electrically coupled to static random access memory (SRAM) 12, central processing unit (CPU) 14, flash read-only memory (ROM) 15, input/output (I/O) pin(s) 18 and functional component 25. Static random access memory (SRAM) 12 stores volatile or temporary data during firmware execution. Central processing unit (CPU) 14 processes information and instructions. Flash read-only memory (ROM) 15 stores information and instructions (e.g., firmware). In one embodiment of the present invention, flash read-only memory (ROM) 15 stores configuration image data. Input/output (I/O) pin(s) 18 provides an interface with external devices (not shown). Configurable functional component 25 is programmable to provide different functions and configurations.

Figure 3:
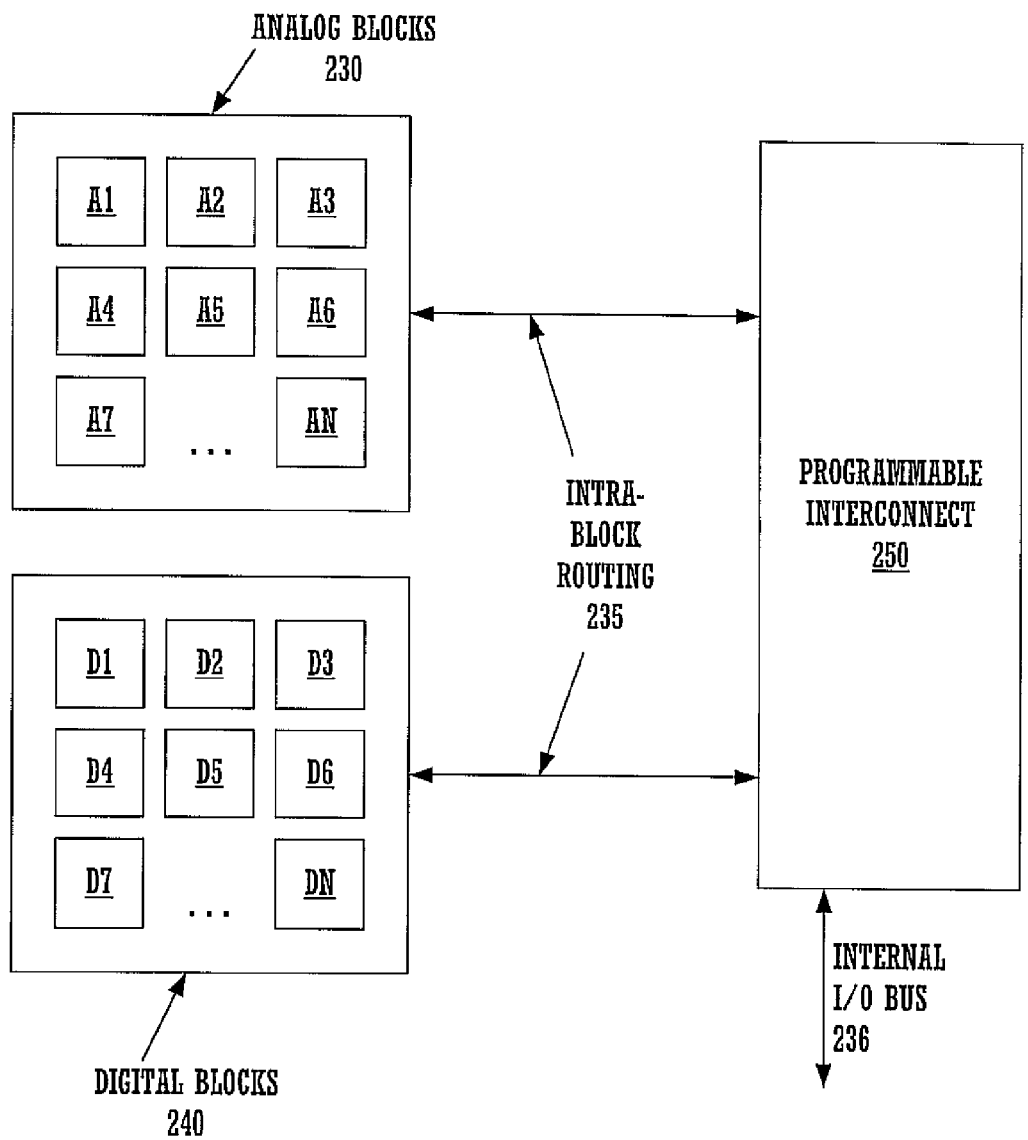
FIG. 3 is a block diagram of an exemplary target device functional component in accordance with one embodiment of the present invention.

One embodiment of a target device functional component 25 is depicted in greater detail in FIG. 3. In this embodiment, target device functional component 25 includes an analog functional block 230, a digital functional block 240, and a programmable interconnect 250. In one exemplary implementation, analog functional block 230 includes a matrix of interconnected analog functional blocks A1 through AN. The number N may be any number of analog functional blocks. Likewise, digital block 240 includes a matrix of interconnected digital functional blocks D1 through DM. The number M may be any number of digital functional blocks.

The analog functional blocks A1 through AN and the digital functional blocks D1 through DM are fundamental building blocks (e.g., fundamental circuits) that may be combined in a variety of configurations to accomplish a variety of functions. Importantly, different combinations of blocks producing different functions may exist at different times within the same system. For example, a set of functional blocks configured to perform the function of analog-to-digital conversion may sample a signal. After processing that signal in the digital domain, some or all of those same blocks (perhaps in conjunction with others) may be recombined in a different configuration to perform the function of digital-to-analog conversion to produce an output signal.

In one embodiment of the present invention, the programmable configuration of integrated circuit 10 components is facilitated by memory (e.g., configuration registers) included in the integrated circuit. In one exemplary implementation of the present invention, the memory includes configuration registers that store a series of logical values (e.g., logical 1 or 0 corresponding to a predetermined voltage level) corresponding to a particular configuration and/or function for an integrated circuit 10 functional block. The series of logic values are programmably configurable and in one embodiment of the present invention the logical values loaded in a configuration register are defined by a configuration image (e.g., stored in a system memory 17).

In one embodiment of the present invention, the configuration and functionality of an electronic device (e.g., a programmable component) is defined by a configuration image loaded in a memory of the electronic device (e.g., microcontroller 10). The information comprising the configuration image may be represented in varying degrees of abstraction. At a low level of abstraction the configuration image is represented by source code (e.g., assembly or machine language) stored as logical values (e.g., logical ones and zeroes) in a memory (e.g., in a system on a chip). At a higher lever of abstraction the configuration image is represented by textual definitions or graphical images (e.g., in a design tool). Additional details on an exemplary implementation of a present invention design tool are set forth in co-pending commonly-owned U.S. patent application Ser. No. 09/989,817, filed Nov. 19, 2001 entitled "System and Method of Dynamically Reconfiguring a Programmable System on a Chip" and patent application Ser. No. 10/256,829, filed Sep. 27, 2002 entitled "Graphical User Interface for Dynamically Reconfiguring a Programmable Device", which are hereby incorporated by this reference.

Figure 4A:
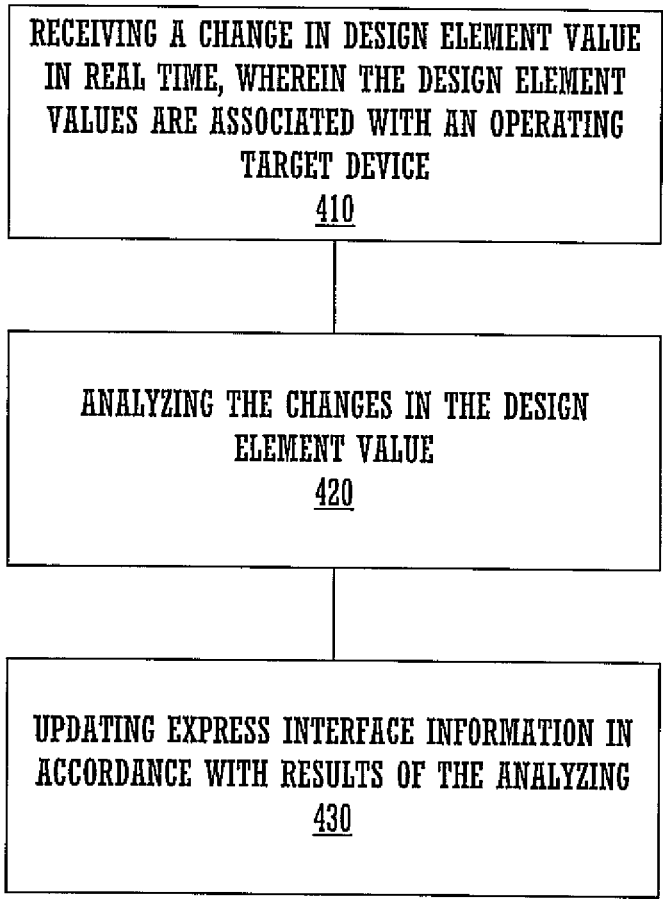
FIG. 4A is a flow chart of an exemplary target device monitoring update method in accordance with one embodiment of the present invention.

FIG. 4A is a flow chart of target device monitoring update method 400A in accordance with one embodiment of the present invention. In one embodiment, target device monitoring method 400 facilitates updating of "widget" presentations in real time. The widget presentations are associated with register values of an operating target device.

In block 410, a change in design element value in real time is received, wherein the design element value is associated with an operating target device. In one embodiment, the receiving includes directing monitoring of design element value information alteration feedback in a target device.

In block 420, the changes in the design element value are analyzed. The analyzing includes determining if a change in the design element value impacts another design element value.

In block 430, express interface information is updated in accordance with results of the analyzing. In one embodiment, updated express interface information is presented in user friendly intuitive graphics user interface. In one exemplary implementation, the updating includes presenting updates symbolically. For example, the updating can include updating widget information corresponding to the design element value. A design element value can include a value associated with one of an input value, transfer function valuator or output value.

In one embodiment, method 400 further includes comparing the changes in the design element values associated with an operating target device to design element values associated with a simulation of a target device.

FIG. 4B is a flow chart of another exemplary target device monitoring update method 400B in accordance with one embodiment of the present invention. In one embodiment a monitor update method 400B includes the following instructions.

In block 451 monitoring of values from an operating target device is directed in real time. In one exemplary implementation, values include states of the operating target device in real time.

In block 452 the values are evaluated. In one embodiment, the evaluating includes examining if a second value of the target device is affected by a change in a first value associated with the target device.

In block 453, express interface information is altered based on the outcome of the evaluating. In one embodiment, the altering includes incorporating information associated with findings of the evaluating into the express information.

In block 454, presentation of the express interface information and the findings is directed. In one embodiment, the presentation is a user friendly symbolic graphical user interface that reflects the altering of the express interface information symbolically.

In one embodiment, instructions for implementing method 400A and 400B are stored on a computer readable medium and the instructions direct processor operations.

FIG. 5A is a flow chart of exemplary host emulation target device control method 500A in accordance with one embodiment of the present invention.

In block 510, a user friendly intuitive graphics user interface for initiating the direction is presented. In one embodiment the GUI includes widgets representing design elements of a target device.

In block 520, a high level direction to change a design element value is received at the express interface. In one embodiment, design element values are associated with an operating target device. In one exemplary implementation, the changes are symbolically initiated. The receiving can include directing monitoring of design element value information alteration feedback from the target device. In one exemplary implementation, a first design element value is changed and feedback from the target device is received wherein the feedback is associated with changes that result in other design element values as a result of the change in the first design element value.

In block 530, design element values corresponding to the direction are created. In one embodiment, the creating includes updating widget information corresponding to the changes in the design element values. The design element value can be associated with an input, transfer function valuators or an output. In one exemplary implementation the creating includes analyzing the direction to determine if another design element is impacted by the change and making corresponding changes to the other design element.

In block 540, the design element values are forwarded to the operating target device in real time.

In one embodiment, the changes in the design element values associated with an operating target device are compared to design element values associated with a simulation of a target device. The comparison can be utilized to troubleshoot and determine if the target device is operating correctly in accordance with expected values and/or if the simulation is an accurate representation of real world experience.

FIG. 5B is a flow chart of target device monitoring update method 500B in accordance with one embodiment of the present invention. In one embodiment a monitor update method 500B includes the following instructions.

In block 551, design element value alteration indications are interpreted. In one embodiment, the values include states of the operating target device in real time.

In block 552, information corresponding to the design element value alteration indications is formulated. In on embodiment, the formulating comprises examining if a second value of the target device is affected by a change in a first value associated with the target device; and incorporating information associated with examination into the express interface information and target configuration information.

In block 553, target configuration information based on the outcome of the evaluating is forwarded to an operating target device in real time.

In block 554, presentation of the express interface information is directed, including information associated with the alteration indications. In one embodiment, the presentation is a user friendly symbolic graphical user interface that reflects the altering of the express interface information symbolically.

In one embodiment, instructions for implementing method 500A and method 500B are stored on a computer readable medium and the instructions direct processor operations.

Thus, the present invention provides convenient and efficient real time monitoring and updating of an electronic device. An electronic device design of the present invention facilitates dynamic monitoring and programmability that enables operationally smooth (e.g., "on the fly") changes in the configuration and/or functionality of the electronic device with minimal or no disruptions to device operations. The present invention allows utilization of the same components to perform different functions and take on different configurations that are capable of satisfying the requirements of different applications. A present invention monitoring and update system also facilitates troubleshooting of device components.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   receiving information indicative of a change in a first design element value, wherein the first design element value is associated with a first component of an operating target device, wherein the operation of the target device includes executing instructions;
   determining, in response to receiving the information indicative of a change in the first design element value, whether a second design element value has changed, wherein the second design element value is associated with a second component of the target device; and
   updating express interface information in accordance with results of the determining.

2. The method of claim 1 wherein the updating comprising presenting information via a graphical user interface.

3. The method of claim 1 wherein the updating comprises presenting updates symbolically.

4. The method of claim 1 wherein the updating comprises updating widget information corresponding to the second design element value.

5. The method of claim 1 wherein the first design element value comprises a value associated with one of an input value, transfer function valuator or output value.

6. The method of claim 1 wherein the first design element value is received from a communication register of the target device.

7. The method of claim 1 further comprising:
   comparing the second design element value to a corresponding design element value associated with a simulation of the target device.

8. The method of claim 1 wherein the receiving comprises monitoring of design element value information in the target device.

9. An express design system comprising:
   a target device configured to implement a variety of configurations and functionalities;
   a host computer system configured to create a design definition of the variety of configuration and functionalities and to monitor operations of the target device, the host computer system being configured to determine, in response to receiving information indicative of a change in a first design element value, whether a second design element value changed, the first design element value being associated with a first component of the target device and the second design element value being associated with a second component of the target device; and
   a board monitor component configured to interface between the host computer system and the target device while the target device is executing instructions.

10. The express design system of claim 9 wherein the board monitor component comprises:
    a USB interface configured to interface with the host computer; and
    an I2C interface configured to interface with the target device.

11. The express design system of claim 9 wherein the board monitor is configured to work on a hex file as the hex file is configured to execute on the target device.

12. The express design system of claim 11 wherein the hex file is static.

13. The express design system of claim 9 wherein the host computer comprises a graphical user interface presentation that automatically updates the graphical user interface presentation in accordance with received design element values.

14. A non-transitory computer readable medium for storing instructions directing a processor's operations, wherein the instructions comprise:
    directing monitoring of values from an operating target device, the values comprising at least a first design element value associated with a first component of the target device and a second design element value associated with a second component of the target device, wherein the operation of the target device includes executing instructions;
    evaluating the values, wherein the evaluating comprises determining, in response to receiving information indicative of a change in the first design element value, whether the second design element value has changed; and altering express interface information based on the outcome of the evaluating.

15. The non-transitory computer readable medium of claim 14 wherein the altering comprises incorporating information associated with findings of the evaluating into the express interface information.

16. The non-transitory computer readable medium of claim 15, the instructions further comprising directing of presentation of the express interface information and the findings.

17. The non-transitory computer readable medium of claim 16 wherein the presentation is a symbolic graphical user interface that reflects the altering of the express interface information symbolically.

18. The non-transitory computer readable medium of claim 14 wherein the values comprise states of the target device.

* * * * *